Patented May 16, 1950

2,507,537

UNITED STATES PATENT OFFICE 2,507,537

ARSENIC SULFATHIAZOLE CHELATE COMPLEX

Ibert Mellan, Chicago, Ill., assignor to Chicago Pharmacal Company, Chicago, Ill., a corporation of Illinois No Drawing. Application January 15, 1945, Serial No. 572,977

1 Claim. (Cl. 260—239.6)

The invention relates to improvements in medicinal compounds and methods of preparing the same and has for its primary object the production of new and novel medicinal compounds or complexes which are highly efficient in use.

Another object of the invention is to provide new and novel compounds or complexes of the salts of inorganic elements such as silver, copper, arsenic, bismuth, mercury, gold or antimony, combined with one or more of the sulfa drugs, such as sulfathiazole, sulfanilamide, sulfapyridine, sulfadiazine or sulfaguanidine, so as to obtain the beneficial effects or therapeutic values of each of the two or more components constituting the above compounds or complexes.

Another object of the invention is to provide such compounds or complexes having such combined beneficial effects or therapeutic values without some or all of the bad or injurious features of some or all of the component parts.

Another object of the invention is to provide new and novel methods of procedure for producing such compounds or complexes.

Other objects will appear hereinafter.

The invention consists of the compounds or complexes and the methods of procedure hereinafter described and claimed.

Example 1

In preparing the silver-sulfathiazole complex, a 1.0 normal solution of sulfathiazole is obtained by adding 255.31 grams of sulfathiazole and 43 grams of sodium hydroxide to 800 cc. of water. When all the sulfathiazole has dissolved, the solution is diluted to 1000 cc. and filtered. The nature of solution, its concentration and the hydrogen ion concentration before and after the reaction play an important role in the character of the resulting complex formed. Therefore, the type of complex desired will determine the condition of manufacture. A solution of silver nitrate is obtained by dissolving 169.9 grams of silver nitrate in enough distilled water to make 1000 cc. 500 cc. of the sulfathiazole solution is then diluted to 5000 cc., and to this is added, with constant stirring, 500 cc. of the silver nitrate solution after the latter has been diluted to 5000 cc. Immediately, a colloidal precipitate is formed which darkens in color on standing, but such darkening in color may be overcome by adding a little ammonia water. The original sulfathiazole solution has a pH of 11.4; the silver nitrate solution a pH of 6.7; and the resulting mixture has a pH of 6.5. The chemical formula or chelate ring of the complex thus produced may be expressed as follows:

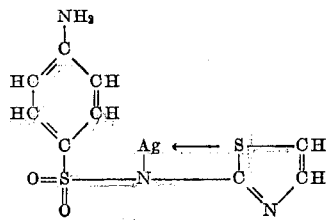

and/or

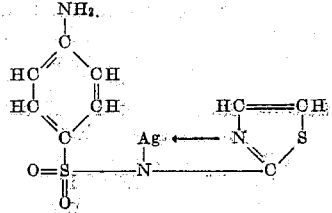

If an excess of the sulfathiazole solution is used so that the resulting reaction mixture is neutral or slightly alkaline, the darkening of the complex is prevented and a colloidal, milky precipitate is formed, which may be removed, washed, concentrated and used as a paste or as a dry powder for the treatment of ringworm infections, such as athlete's foot, with good results.

Example 2

In preparing the silver sulfanilamide complex, a solution of sulfanilamide is obtained by adding 172.14 grams of sulfanilamide and 40 grams of sodium hydroxide to 800 cc. of distilled water. Ordinarily, a clear solution will result, but a small, additional amount of sodium hydroxide may have to be added to dissolve the sulfanilamide completely. The resulting solution is diluted to 1000 cc. and filtered. 10 liters of the aqueous solution containing 2500 cc. of 1.0 N sulfanilamide sodium is added, with constant stirring, to 10 liters of an aqueous solution containing 2500 cc. of 1.0 N silver nitrate. A white colloidal precipitate will result in a mixture having a pH of 6.4, and may be removed, washed and concentrated as before. The chemical formula or chelate ring of the complex thus produced may be expressed as follows:

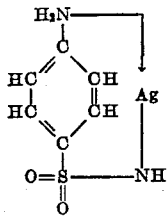

Example 3

In preparing the silver-sulfapyridine complex, a solution of sulfapyridine is obtained by adding 289.18 grams of sulfapyridine sodium, $$C_{11}H_{10}N_3O_2SNaH_2O$$

to enough water to make 1000 cc. and then filtering the same. 10 liters of an aqueous solution containing 2500 cc. of 1.0 silver nitrate solution added, with constant stirring, to 10 liters of an aqueous solution containing 2500 cc. of 1.0 N sulfapyridine sodium produces a gelatinous precipitate which transforms the reaction mixture into pasty nearly solid mass, the mixture having a pH of 8.9, and may be removed, washed and concentrated as before. The chemical formula or chelate ring of the complex thus produced may be expressed as follows:

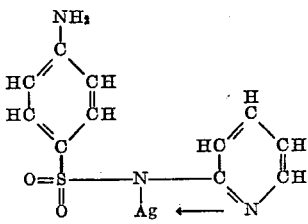

Example 4

In preparing the silver-sulfadiazine complex, 2500 cc. of 1.0 N sulfadiazine sodium solution diluted by water to 10 liters is added slowly, with constant stirring, to 10 liters of an aqueous solution containing 2500 cc. of 1.0 N silver nitrate solution. This produces a thick, cream-colored precipitate which turns white in from five to thirty minutes and has a pH of 11.0, and the precipitate may be removed, washed and concentrated as before. Another way of making this complex is to mix 10 liters of an aqueous solution containing 5000 cc. of 1.0 N sulfadiazine sodium with 10 liters of an aqueous solution, containing 2500 cc. of 1.0 N silver nitrate. This mixture has a pH of 7.7. The chemical formula or chelate ring complex thus produced may be expressed as follows:

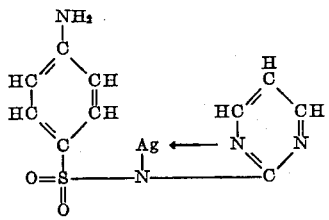

Example 5

In preparing the silver-sulfaguanidine, 192 grams of sulfaguanidine is added to 1000 cc. of boiling water and added slowly to 1000 cc. of 1.0 N silver nitrate. Upon standing over night at room temperature, needle-like crystals of the complex are formed. The chemical formula or chelate ring of the complex thus produced may be expressed as follows:

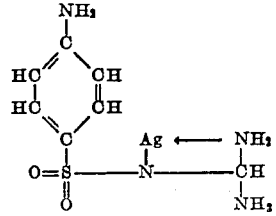

Solutions containing the corresponding compounds of the metals mentioned, may be prepared as follows:

Example 6

*Copper sulfate solution.*—A 1.0 molar copper sulfate solution is prepared by adding 249.71 grams of $CuSO_4.5H_2O$ to enough water to make 1000 cc. Then filtered.

Example 7

*Mercuric chloride solution.*—A 0.5 normal mercuric chloride solution is prepared by dissolving 135.8 grams of mercuric chloride in enough water to make 2000 cc. When all of the salt dissolves filter.

Example 8

*Bismuth chloride solution.*—A 0.5 molar solution is prepared by dissolving 259.5 grams of basic bismuth carbonate $((BiO)_2CO_3.\frac{1}{2}H_2O)$ in 425 cc. of concentrated hydrochloric acid and diluting to 1000 cc. with water.

Example 9

*Arsenic trichloride solution.*—A 1.0 N arsenic trichloride solution is prepared by dissolving with the aid of heat, 66 grams of arsenic trioxide U. S. P. XI in 400 cc. of concentrated hydrochloric acid and sufficient water to make 1000 cc.

Example 10

*Gold tribromide solution.*—A 1.0 N gold tribromide solution is prepared by dissolving 145.65 grams of gold tribromide in sufficient water to make 1000 cc. The addition of hydrochloric acid may be needed to aid in getting the salt in solution.

Example 11

*Antimony solution.*—A 1.0 N solution is prepared by dissolving 111.3 grams of antimony and potassium tartrate in sufficient water to yield a volume of 1000 cc.

From these, by replacing the silver atom in the foregoing formulae with the elements, $Cu/2$, $Bi/3$, $Hg/2$, $As/3$, $Au/3$, $Sb/3$, the various other complexes may be formed as follows:

Example 12

*Copper sulfanilamide complex.*—This complex is made by mixing 1500 cc. of an aqueous solution containing 500 cc. of a 1.0 N sulfanilamide sodium with 1500 cc. of an aqueous solution containing 250 cc. 1.0 molar copper sulfate. A thick gelatinous green precipitate is formed which turns blue-green in color. The color varies with the method of making and the pH of the resulting mixture. In this bath the resulting mixture has a pH of 9.7. The quantities of each solution can be so varied as to use up all of the sulfanilamide and the copper sulfate or to have an excess of either the sulfanilamide or the copper sulfate. A light green colored complex of copper sulfanilamide is made by mixing 1500 cc. of an aqueous solution containing 500 cc. 1.0 N sulfanilamide with 1500 cc. of an aqueous solution containing 500 cc. 1.0 molar copper sulfate. The resulting mixture has a pH of 4.7.

*Example 13*

Copper sulfapyridine complex.—500 cc. of 1.0 sulfapyridine sodium diluted to 1000 cc. is added to 1000 cc. of an aqueous solution containing 250 cc. of 1.0 molar copper sulfate. A light green precipitate is formed which turns olive-green and finally purple in color. The mixture has a pH of 7.4.

*Example 14*

Copper sulfadiazine complex.—One liter of solution containing 500 cc. 1.0 N sulfadiazine is mixed with one liter of solution containing 250 cc. 1.0 molar copper sulfate. A light green precipitate is formed which changes to a dark green and finally to a purple colored precipitate. The resulting mixture before filtrate and purification has a pH 8.4.

*Example 15*

Copper sulfathiazole complex.—One liter of solution containing 500 cc. of 1.0 N sulfathiazole sodium is added to 1000 cc. of a solution containing 250 cc. 1.0 molar copper sulfate. A thick gelatinous precipitate is formed which goes thru a change of fleeting colors and finally turns purple. When the reaction is complete the pH is 5.6.

*Example 16*

Copper sulfaguanidine complex.—192 grams of sulfaguanidine are dissolved in 1000 cc. of hot water and to this is added 500 cc. of 1.0 molar copper sulfate. The solution turns green in color and a precipitate begins to form, so 200 cc. of concentrated hydrochloric acid is added. Upon standing crystals of copper sulfaguanidine begin to form.

*Example 17*

Mercury sulfathiazole complex.—Two liters of solution containing 500 cc. of 1.0 N sulfathiazole sodium are mixed with two liters of solution containing 1000 cc. of 0.5 mercuric chloride. A white thick precipitate is formed and the mixture has a pH of 6.5.

*Example 18*

Mercury sulfadiazine complex.—One liter of an aqueous solution containing 500 cc. of 1.0 N sulfadiazine sodium is mixed with 2000 cc. of an aqueous solution containing 1000 cc. of 0.5 N mercuric chloride. A white precipitate is formed and the mixture has a pH of 9.4. Another way of making this complex is to mix 1000 cc. of 0.5 N sulfadiazine sodium with 2000 cc. of 0.5 N mercuric chloride. A thick white precipitate is formed. The resulting mixture has a pH of 7.8.

*Example 19*

Mercury sulfapyridine complex.—500 cc. of 1.0 N sulfapyridine sodium diluted to a liter is added to 2000 cc. of 0.5 N mercuric chloride solution. A thick white gelatinous precipitate is formed. The mixture has a pH 6.4.

*Example 20*

Mercury sulfanilamide complex.—500 cc. of 1.0 N sulfanilamide sodium diluted to a liter is added, with constant stirring, to 2000 cc. of 0.5 N mercuric chloride. A white precipitate is formed and after the reaction is complete the mixture has a pH of 6.7.

*Example 21*

Bismuth sulfathiazole complex.—To 500 cc. of 0.5 molar bismuth chloride solution is added to 750 cc. of 1.0 N sulfathiazole sodium. A precipitate is immediately formed which is dissolved by the addition of 10 cc. of concentrated hydrochloric acid and warming. Upon standing over night crystals of the complex separate. Another method of obtaining the bismuth sulfathiazole complex is to dissolve 192 grams of sulfathiazole in 500 cc. 0.5 molar bismuth chloride. It may be necessary to heat the solution or add a small quantity (20 cc.) of concentrated hydrochloric acid to completely dissolve the sulfathiazole. Upon cooling the solution crystals of the complex begin to form.

*Example 22*

Bismuth sulfaguanidine complex.—500 cc. of 0.5 molar bismuth chloride are used to dissolve 175 grams of sulfaguanidine. At times it is necessary to use heat and the addition of a little concentrated hydrochloric acid (60 cc.). Upon cooling the complex is formed.

*Example 23*

Bismuth sulfaguanidine complex.—To 1000 cc. of 0.5 molar bismuth chloride is added 192 grams of sulfaguanidine. The mixture is heated and 200 cc. of hydrochloric acid added. The addition of acid and the application of heat results in a clear solution. Upon cooling the solution crystals of bismuth sulfaguanidine complex are formed.

*Example 24*

Bismuth sulfadiazine complex.—This complex is formed by adding 500 cc. of 0.5 molar bismuth chloride solution to 750 cc. of 1.0 N sulfadiazine sodium. A thick precipitate is formed which is dissolved by the addition of 200 cc. concentrated hydrochloric acid and heat. Upon standing and cooling yellow crystals are formed. These are removed and are purified by either working or recrystallization. Another method of preparing this complex is to dissolve 180 grams of sulfadiazine in 500 cc. of 0.5 molar bismuth chloride. To aid solution it may be necessary to apply heat and to add more hydrochloric acid (60 cc.). Upon standing or by cooling yellow crystals of bismuth sulfadiazine are formed.

*Example 25*

Bismuth sulfapyridine complex.—To 500 cc. of 0.5 molar bismuth chloride is added 750 cc. of 1.0 N sulfapyridine sodium solution. A precipitate is formed which is dissolved by heating and adding 100 cc. of hydrochloric acid. Upon standing or cooling translucent crystals are formed which could be purified by recrystallization. Another way to prepare this complex is to dissolve 186.9 grams of sulfapyridine in 500 cc. of 0.5 molar bismuth chloride solution. At times it may be necessary to apply heat to aid in the solution or it may require the addition of hydrochloric acid. Upon standing a crystalline complex is formed.

*Example 26*

Bismuth sulfanilamide complex.—To 500 cc. of 0.5 molar bismuth chloride solution is added 129 grams of sulfanilamide. To aid solution heat is applied and 30 cc. of hydrochloric acid is added. Upon dilution with water, the bismuth sulfanilamide complex separates out and is removed and washed by filtration.

Example 27

*Arsenic sulfathiazole complex.*—To make this complex add 255 grams of sulfathiazole to 1000 cc. of 1.0 N arsenic chloride solution and stir. In a few minutes the whole mass solidifies. The solid complex is then broken up and washed. Another method of making this complex is to add 2000 cc. of boiling water to a liter of 1.0 N arsenic chloride and then dissolve in this solution 255 grams of sulfathiazole. Upon standing an arsenic sulfathiazole complex crystallizes out of solution. In place of the two liters of boiling water we can use one liter of water containing 50 cc. of concentrated hydrochloric acid.

Example 28

*Arsenic sulfaguanidine complex.*—This complex is formed by adding 232 grams of sulfaguanidine to 1000 cc. of 1.0 N arsenic chloride solution. The mixture is heated to aid in the solution of sulfaguanidine. Upon standing the complex crystallizes out of solution.

Example 29

*Arsenic sulfadiazine complex.*—250 grams of sulfadiazine is dissolved in 1000 cc. of 1.0 N arsenic chloride solution with the aid of heat. Upon standing or cooling the complex is formed.

Example 30

*Arsenic sulfapyridine complex.*—249.2 grams of sulfapyridine are dissolved in 1000 cc. of 1.0 N arsenic chloride solution with or without the aid of heat. Upon standing and cooling the complex crystallizes out of solution.

Example 31

*Arsenic sulfanilamide complex.*—To form this complex dissolve 172 grams of sulfanilamide in 1000 cc. of arsenic chloride solution with or without the aid of heat. Upon cooling the complex of arsenic sulfanilamide will crystallize out of solution.

Example 32

*Gold sulfathiazole complex.*—This complex is formed by adding 102 grams of sulfathiazole to 400 cc. of 1.0 N gold chloride. When all of the sulfathiazole dissolves, a red precipitate begins to form. The formation of this red complex is hastened when the solution is heated. The complex can be purified by dissolving it in a dilute solution of hydrochloric acid and recrystallizing.

Example 33

*Gold sulfaguanidine complex.*—92 grams of sulfaguanidine are dissolved in 400 cc. of 1.0 N gold chloride solution and 100 cc. of water. A light brown colored complex is formed upon standing.

Example 34

*Gold sulfanilamide complex.*—69 grams of sulfanilamide are dissolved in 400 cc. of 1.0 N gold chloride and 100 cc. of water. In one hour or so a brown to red colored complex of gold sulfanilamide is formed.

Example 35

*Gold sulfadiazine complex.*—100 grams of sulfadiazine are dissolved in 400 cc. of 1.0 N gold chloride and 100 cc. of water. Upon standing a red colored complex is formed.

Example 36

*Gold sulfapyridine complex.*—100 grams of sulfapyridine are dissolved in 400 cc. of 1.0 N gold chloride and 300 cc. of 10% hydrochloric acid. Upon standing or cooling a red colored complex is formed.

Example 37

*Antimony sulfathiazole complex.*—This complex is formed by mixing 500 cc. of antimony and potassium tartrate with 500 cc. of 1.0 N sulfathiazole sodium. In the course of a minute the complex is formed. Another method of making this white antimony sulfathiazole complex is to add 250 grams of sulfathiazole to 100 cc. of 1.0 N antimony and potassium tartrate. To aid in the solution of the sulfathiazole 250 cc. of concentrated hydrochloric acid is added. Upon standing the complex is formed.

Example 38

*Antimony sulfaguanidine complex.*—232 grams of sulfaguanidine are added to 10 cc. of 1.0 N antimony and potassium tartrate. From 100 to 300 cc. of concentrated hydrochloric acid are added to completely dissolve the sulfaguanidine. Upon standing the complex separates out of the solution.

Example 39

*Antimony sulfadiazine complex.*—This complex is formed by adding 500 cc. of 1.0 N antimony and potassium tartrate to 500 cc. of 1.0 N sulfadiazine. Another method is to dissolve 250 grams of sulfadiazine in 1000 cc. of antimony and potassium tartrate containing 450 cc. of concentrated hydrochloric acid. Upon standing over night the complex precipitates out.

Example 40

*Antimony sulfapyridine complex.*—This complex is formed by adding 500 cc. of 1.0 N antimony and potassium tartrate to 500 cc. of 1.0 N sulfapyridine sodium. More rapid and complete precipitation is brought about by cooling the solution once the reaction has taken place. Another method is to dissolve 249 grams of sulfapyridine in 1000 cc. of 1.0 N antimony and potassium tartrate containing 300 cc. of concentrated hydrochloric acid. Upon standing over night or cooling the crystalline complex is formed.

Example 41

*Antimony sulfanilamide complex.*—This complex is formed upon mixing 500 cc. of 1.0 N antimony and potassium tartrate with 500 cc. of 1.0 N sulfanilamide sodium. Another way of making this complex is to dissolve 172 grams of sulfanilamide in 1000 cc. of 1.0 N antimony and potassium tartrate containing 300 cc. of concentrated hydrochloric acid. From the clear solution a precipitate is formed upon standing.

While I have set forth in detail the preferred compounds and methods of procedure, these are capable of variation and modification without departing from the spirit of the invention. I therefore do not wish to be limited to the precise details disclosed, but desire to avail myself of such variations and modifications as fall within the scope of the appended claim.

I claim:

As a new chemical compound of therapeutic value an arsenic sulfathiazole complex in which the arsenic has at least one bond with the $N_1$ atom of a sulfathiazole structure, and at least one chelate bond with one of the strongly polar atoms of the thiazole ring.

IBERT MELLAN.

(References on following page)

REFERENCES CITED

The following references are of record in the file of this patent:

UNITED STATES PATENTS

| Number | Name | Date |
|---|---|---|
| 2,407,177 | Roblin et al. | Sept. 3, 1946 |
| 2,410,793 | Winnek et al. | Nov. 5, 1946 |
| 2,422,688 | Lott | June 24, 1947 |

FOREIGN PATENTS

| Number | Country | Date |
|---|---|---|
| 849,504 | France | Nov. 25, 1939 |
| 111,230 | Australia | Aug. 22, 1940 |

OTHER REFERENCES

Scudi: Jour. Ind. & Eng. Chem. (Analytical Ed.), vol. 10, No. 6 (June 15, 1938).

Crossley et al.: Jour. Am. Chem. Soc. (Oct. 1939), pp. 2950–2955.

Jour. Am. Chem. Soc. (Dec. 1939), page 3593.

Braun et al.: Jour. Am. Chem. Soc., vol. 63 (Dec 1941), p. 3523.

Ragno et al.: "Gazz. Chim. Ital.," vol. 71 (1941), pp. 235–242.